March 23, 1937.  O. A. ROSS  2,074,517
SYSTEM FOR SYNCHRONOUSLY RECORDING ACTION AND SOUND
Filed Sept. 2, 1936
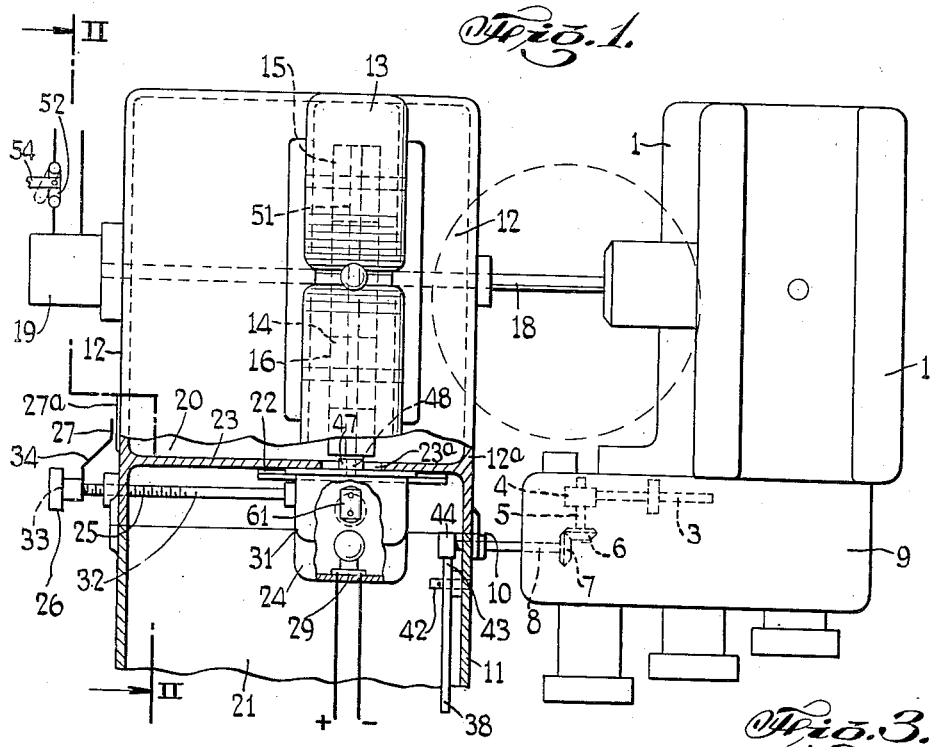
Fig. 1.
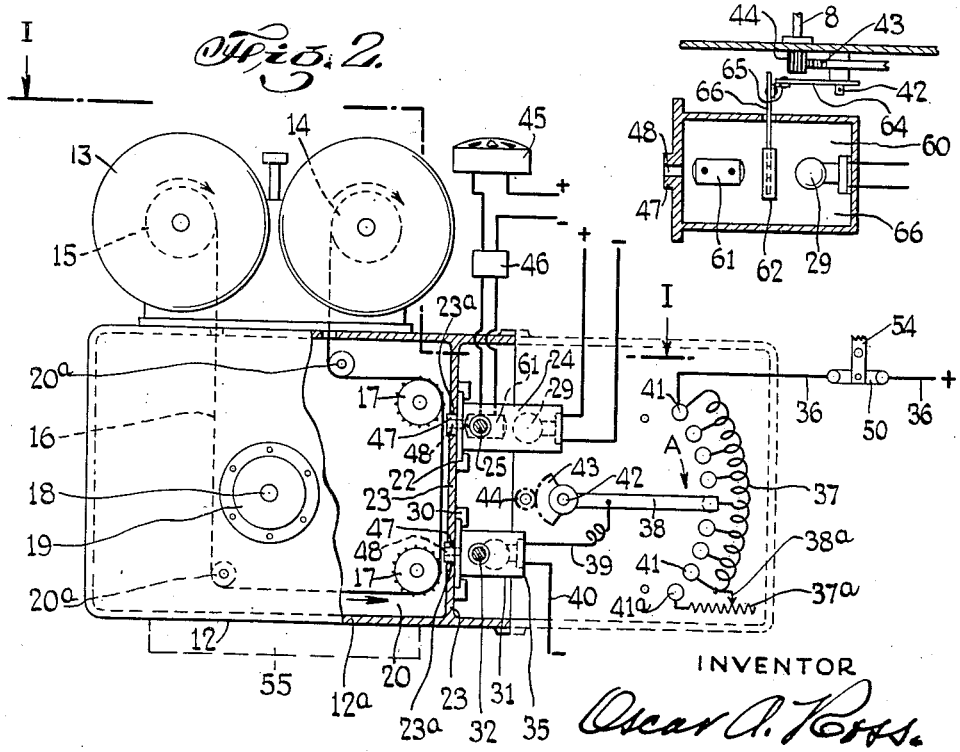
Fig. 2.
Fig. 3.
INVENTOR
Oscar A. Ross.

Patented Mar. 23, 1937

2,074,517

UNITED STATES PATENT OFFICE 2,074,517

SYSTEM FOR SYNCHRONOUSLY RECORDING ACTION AND SOUND

Oscar A. Ross, New York, N. Y.

Application September 2, 1936, Serial No. 99,177

18 Claims. (Cl. 88—16.2)

This application forms a continuation in part application of my co-pending applications Serial No. 303,652, filed September 18, 1928, and Serial No. 687,803, filed September 1, 1933.

This invention relates to the photographic recording of sound synchronized with action and more particularly to that class commonly known as "talking movies".

When photographically recording motion pictures, it is the practice to "fade in" and "fade out" scenes of action to produce a more pleasing presentation to an audience. Such fade ins and fade outs are accomplished by certain mechanism associated with motion picture cameras and one of the objects of this invention is to associate the aforesaid mechanism with a fade in and fade out mechanism of a sound recording camera whereby the sound and action records are faded in and faded out in synchronism. A positive print motion picture film having such synchronized fade ins and fade outs is shown in my copending application Serial No. 236,980, filed December 1, 1927.

Another object of this invention is to furnish apparatus for recording sound onto selected sound tracks of a multiple track sound film and indicate the track onto which the sound is being recorded.

Another object of the invention is to furnish apparatus for recording sound onto selected tracks of a multiple sound track sound film, selectively light fogging said sound tracks and indicating the sound track being light fogged.

Another object of the invention is to furnish apparatus for recording sound onto light sensitive film wherein the sound track onto which said sound is recorded is pre-exposed sufficiently whereby the exposure during the recording of the sound lies within the substantially straight portion of the exposure curve of the particular film onto which said sound is recorded.

Another object of the invention is to effect said pre-exposure by means of a light source which is also utilized for variably exposing said sound track for the purpose of fading the sound record thereon in and out at desired locations.

Another object of the invention is to furnish novel and peculiar structure for the accomplishment of said constant pre-exposure and said variable exposure of photographically recorded sound records, said novel and peculiar structure being included as a part of a sound recording camera having a light valve for projecting modulated light onto said light sensitive film, said modulated light corresponding to sound.

Another object is to furnish sound motion picture apparatus wherein the action recording camera and the sound recording camera are spaced and advance independent action and sound films, said cameras being operatively connected for synchronously advancing said films.

Another object is to furnish a sound recording camera wherein the film reel housing and the film advancing housing are made as separate units whereby the sound recording camera may be quickly re-loaded with fresh film.

Another object is to furnish an independent sound recording camera wherein all the operating parts are completely housed with the exception of indicators for indicating the position of the film with respect to the sound recording unit.

Other objects and advantages will appear as the description of the invention progresses, and the novel feature of the invention will be pointed out in the appended claims.

This invention consists in the novel construction and arrangement of parts hereinafter described, delineated in the accompanying drawing, and particularly pointed out in that portion of this instrument wherein patentable novelty is claimed for certain and peculiar features of the apparatus, it being understood that, within the scope of what hereinafter thus is claimed, divers changes in the form, proportions, size and minor details of the structure may be made without departing from the spirit of, or sacrificing any of the details of the invention.

In describing the invention in detail, reference is had to the accompanying drawing, wherein I have illustrated embodiments of my invention, and, wherein like characters of reference, designate corresponding parts throughout the several views, and in which:—

Figure 1 is a top part plan, part sectional, part diagrammatic view of one embodiment of the invention taken on line 1—1 of Fig. 2 and Fig. 2 is a side part plan, part sectional and part diagrammatic view of the same taken on line 2—2 of Fig. 2, and Fig. 3 is a part sectional view of a modified form of the invention.

Referring to Figures 1 and 2, motion picture camera 1, shown preferably as a standard motion picture camera, is equipped with a dissolve mechanism of known form for producing fade in and fade out effects, the control button 2, when rotated in one direction producing a fade in, and in the other a fade out, when said fade ins and fade outs are effected, a certain gear 3 is caused to rotate, in one direction for fade in and in the other for fade out.

One form of applicant's invention comprises the addition of a pinion 4 secured to shaft 5 operating in suitable bearings (not shown, in camera 1, said pinion meshing with gear 3.

To one end of shaft 5 is secured a bevel pinion 6 meshing with a similar pinion 7 at right angles thereto secured to shaft 8 supported by and extending through turret 9 to bearing 10 of housing 11 of sound recording camera 12, having film magazine 13 detachably secured thereto, said magazine having film feed reel 15 and take up reel 14 supporting sound record film 16 advanced by film guide sprockets 17—17 suitably geared to and driven by shaft 18 operated by motor 19, said shaft being arranged to operate the sound recording camera 12 and action recording camera 1 in synchronism, whereby the sound record film 16 and the action record film in camera 1 are advanced at the same rate of speed, or in constant proportionate rates of speeds thereof one to the other depending upon the reproducing apparatus in which said films are to be jointly exhibited.

Sound recording camera 12 comprises in part film advancing housing 12a having chamber 20. To housing 12a is suitably secured mechanism housing 11 having chamber 21. Trackways or rail portions 22 formed on wall 23 of housing 12a are arranged to adjustably support sound recording light valve unit 24, said unit having mating portions slidable on said rails, the movement of said unit being transversely with respect to the advancement of sound film 16, a suitable screw 25 rotated by handle 26 supporting indicator 27 operating over dial 27a being arranged to position said unit with respect to said film for recording sound records onto a selected sound track of said film. Light valve unit 24 includes a light source 29, the light from which is modulated by light valve and optical system 61 in response to sound directed into microphone 45, said modulated light being projected as an attenuated light beam onto film 16. Unit 24 is also formed with a male portion 47 extending through an opening 23a in wall 23, said male portion having a light slit 48 through which said modulated light is projected onto film 16. Said male portion is arranged to be moved in said opening without permitting the entrance of extraneous light to film 16.

Also formed on wall 23 is a second trackway or rails 30 arranged to adjustably position light projecting or fogging unit 31 transversely with respect to the advance of film 16. Said unit is also arranged to be moved by screw 32 having operating handle 33 supporting indicator 34 operating over a dial similar to dial 27a, the rotation of said screw acting to position said fogging unit 31 relatively transversely with respect to film 16 for light fogging a selected sound track thereon and simultaneously indicating the track being fogged. Fogging, or exposure unit 31 includes a light source 35, the energy to which flows from wire 36, switch 50 rheostats 37 and 37a, contact lever 38 and wire 39, the energy from said light source returning to the energy source through wire 40. Lever 38 pivoted on stud 42 is formed with sector portion 43 meshing with pinion 44 secured to shaft 8. Upon rotation of shaft 8 lever 38 is constrained to pass over and contact with the several contacts 41 and 41a forming part of rheostats 37 and 37a, thereby cutting resistance in and out in series with light source 35 for varying the light intensity thereof.

Sound directed into microphone 45 is suitably amplified by translating or gain unit 46, the output of which energizes the light valve of sound recording unit 24 for modulating the light projected by light source 29, said modulated light being projected through light slit 48 by said optical system for recording said sound onto film 16.

Light fogging or exposure unit 31 is also supplied with a male portion 47 extending through another opening 23a in wall 23 to the light sensitive face of film 16, said male portion including a light slit 48 through which the light from light source 35 is projected onto said film. Said male portion 47 is likewise movable in said opening transversely with respect to the advance of said film.

The resistance of rheostat 37a connected between contacts 41 and 41a may be varied by adjustment of contact lever 38a independently of the contact lever 38, whereby light source 35 will project light of constant intensity after lever 38 has reached contact 41a and remains thereon.

Motion picture camera 1 and sound recording camera 12 are assumed to be in the process of recording a dissolve or "fade in" in both of cameras 1 and 12, the lever 38 of sound recording camera 12 moving in the direction of arrow A whereby resistance of rheostat 37 is being cut in and the intensity of light source 35 is being decreased.

Before placing cameras 1 and 12 in service, lever 38 is normally contacting with the highest contact 41 whereby light source 35 will project maximum light to fog or exposed film 16 upon closing switch 50, as said film advances toward the sound recording unit. Said maximum light fogging is sufficient to prevent the recording of any reproducible sound by the modulated light projected by the sound recording unit 24 as said modulated light is exposed over said fogged area. As long as lever 38 remains in contact with the uppermost contact 41, film 16 will receive a constant maximum exposure as it advances, the portion of track 51 so exposed being substantially opaque to light when said film is developed.

After cameras 1 and 12 have been placed in service by energizing motor 19 and it is desired to record a scene including action and sound, the dissolve button 2 is rotated to the "fade in" position. As this occurs gear 3 is set in motion thereby causing shafts 5 and 8 to be rotated. Upon rotation of shaft 8 lever 38 begins to move downwardly over successive contacts 41 until the lowest or constant exposure contact 41a is reached, whereupon said lever stops and the "fade in" of the sound record has been completed, this usually being accomplished during the advancement of approximately 4 feet of sound film.

As lever 38 moves downwardly over contacts 41 the resistance of rheostat 37 is gradually included in series with light source 35 thereby gradually diminishing the light intensity of the light therefrom projected through light slit 48 onto sound track 51. As lever 38 engages contact 41a the resistance 37a is included, this resistance being proportioned to energize light source 35 to continuously expose light track 51, this exposure corresponding substantially to the toe of the H and D exposure curve of the particular film onto which the sound is being recorded whereby the sound record recorded by the modulated light projected by sound recording unit 24 will be recorded within the straight line portion of said H and D curve thereby permitting a more faithful recording and reproduction of said sound. The adjustment of resistance in rheostat 37a by contact lever 38a permits adjusting the constant value of pre-exposure of a sound track prior to the recording of the sound thereunto by the sound recording unit 24 whereby said pre-exposure may be adjusted to a constant value for differing emulsions on a sound film as 16.

Upon the termination of said scenes the control button 2 is rotated to the "fade out" position whereupon gear 3 and shafts 5 and 8 are oppositely rotated whereupon lever 38 gradually ascends and gradually cuts out rheostats 37a and 37 and whereupon the energy to light source 35 will be gradually increased thereby gradually increasing the light intensity of light source 35 as film 16 advances and thereby producing a "fade out" which will be completed when said lever 38 has reached the uppermost contact 41 and whereafter a maximum fogging of sound track 51 will again occur during the advancement of film 16 and until the switches 50 and 52 are open for discontinuing cameras 1 and 12 from service. It is to be noted that said switches are connected by a common rod 54 whereby both of said switches may be operated simultaneously.

Since the sounds recorded by sound recording unit 24 is photographically superimposed on the same portion of the film which is photographically faded by the light fogging or exposure unit 31 said sound will be faded in and out when said film or a print thereof is advanced for reproducing said sound as more fully described in said copending application Serial No. 236,980 filed December 1, 1927.

It is to be noted that by supplying adjusting screws as 25 and 32 and indicators as 27a and 34 that the sound recording unit 24 and light exposure unit 31 may be adjustably positioned with respect to film 16 for recording sound onto a selected sound track as 51 after pre-exposure thereof, at the same time indicating the sound track being so treated.

Whereas the units as 24 and 31 have been shown as adjustable, they may be fixed and the sprockets 17, idlers 20a and magazine 13 may be made movable with respect to camera housing 12a, an adjusting screw similar to screw 25 being arranged to position said parts transversely with respect to said fixed light valve units.

Whereas only one each of the light projecting units as 24 and 31 has been shown, a plurality of each of said units may be supported by wall 23 of camera 12 as more fully described in my Patent No. 1,990,754 granted February 12, 1935.

Whereas the rotation of shafts 8 has been shown to gradually cut in and out resistance in series with light source 35, said shaft may be made to move said light source to and from light slit 48 as more fully described in my Patent No. 1,991,630 granted February 19, 1935.

Cameras 1 and 12 may be suitably mounted on a common base 55, or if desired the sound camera 12 may be positioned remotely from the scene of action recorded by action camera 1 each camera having independent operating motors inter-connected for synchronous operation thereof.

It is to be understood that when camera 1 is photographically recording action, the camera 12 may be simultaneously recording the sound accompanying the action, said actions more generally comprising scenes which are faded in and out as a complete continuous record forming part of a motion picture production.

Referring to the modified form of light valve unit 60 disclosed in Fig. 3, housing 66 having matting guide portion 67 includes light source 29 arranged to project modulated light through diaphragm or iris unit 62 and thence through optical system and light valve unit 61 arranged to form an attenuated light beam thereof at the film 16. The opening of said diaphragm or iris in unit 62 is controlled by lever 63. A modified sector lever 64 actuated by pinion 44 has the free end thereof connected to lever 63 by link 65, whereby operation of sector lever 64 acts to open and close said diaphragm or iris in unit 62, thereby increasing or decreasing the amount of modulated light reaching film 16, said increase or decrease of the modulated light acting to fade out or in the sound record during the recording thereof.

Whereas the faded sound track portions of film 16 are made fadingly opaque on a negatively recorded positive film, in the editing of the sound motion picture production, of which the film forms a part, the duplicating negative for producing released prints may be a print or rerecording of film 16, said duplicating negative having transparently faded portions corresponding to the opaquely faded portions of film 16 whereby the released print will have corresponding opaquely faded portions between the successive sound sequences. It is known that a negative record of photographically recorded sound will reproduce said sound just as effectively as a positive record thereof.

What I claim is:

1. In sound motion picture recording apparatus, means for recording scene, means for recording sound, means for effecting synchronous operation of the scene and sound recording means, means for fading the scene record during the recording thereof, means for fading the sound record independently of the recording of the sound by said sound recording means, and means for effecting synchronous operation of the scene and sound fading means.

2. In sound motion picture recording apparatus, a motion picture film, means for photographically recording scene thereon, a sound record member supported independently of the film, means for recording sound thereon, means for advancing the film and the sound record member synchronously during the recording of the scene and sound, means for photographically fading the scene record as the motion picture film is advanced, means for fading the sound record as the sound record member is advanced, and means for effecting synchronous operation of the scene and sound fading means.

3. In sound motion picture recording apparatus, a motion picture film, a sound film supported independently of the picture film, means for advancing the films synchronously, means for photographically recording motion pictures on the picture film during the advancement thereof, means for photographically recording sound on the sound film during the advancement thereof, means for photographically fading the picture record as the film is advanced, means for photographically fading the sound record as the sound film is advanced, and means for effecting synchronous operation of the picture and sound fading means for fading the pictures and the sound in and out synchronously.

4. In sound motion picture recording apparatus, a motion picture film, a sound film supported independently of the picture film, means for advancing the films synchronously through separated film paths, means for photographically recording motion pictures on the picture film during the advancement thereof through the picture film path, means for photographically recording sound on the sound film during the advancement thereof through the sound film path, means for photographically fading the picture record as the film is advanced, means for photographically fading the sound record as the sound film is advanced, and means for operatively connecting the picture record fading means and the sound record fading means for effecting synchronous fading of the picture and sound record as the films are advanced.

5. In sound motion picture recording apparatus, a motion picture camera including means for advancing a motion picture film therein, a sound camera including means for advancing a sound film therein, means for photographically recording motion pictures on the picture film during the advancement thereof by the motion picture camera, means for photographically recording sound on the sound film during the advancement thereof by the sound camera, means for effecting synchronous operation of the picture and sound camera advancing means, means for photographically fading the pictures recorded onto the picture film during the recording thereof by the picture recording means, means for photographically fading the recorded sound on the sound film as the film advances and means connecting the cameras for effecting synchronous operation of the picture and sound fading means for fading the recorded pictures and sound in and out synchronously.

6. The combination with separately advanced picture and sound films, of means for recording sound onto the sound film and means for recording pictures onto the picture film as they advance, means for fading the picture record during the picture recording and means for fading the sound record during the sound recording, and means operatively connecting the sound and picture fading means for effecting synchronous fading of the sound and picture records recorded onto the films.

7. The method of recording sound motion picture productions which involves, advancing sound and picture films synchronously through spaced channels, photographically recording pictures of the scenes of the productions onto the picture film and simultaneously photographically recording the sound of the productions onto the advancing sound film, and during the sound and picture recording simultaneously photographically fading the records of sound and pictures in at the beginning of the scenes and simultaneously photographically fading the records out at the end of the scenes.

8. In sound motion picture recording apparatus, a picture recording camera including mechanism for advancing picture film, means for photographically recording the pictures onto the picture film as it advances, a sound recording camera including mechanism for advancing a sound film having a plurality of parallel sound tracks longitudinally thereof, means including a light valve unit for photographically recording sound onto a track of the advancing sound film, means for moving the light valve unit and the sound film transversely relatively with respect to the advancement of the film for recording the sound onto a selected track, and means operatively connecting the picture film advancing mechanism and the sound film advancing mechanism for effecting synchronous advancement of the films.

9. In sound motion picture apparatus, a picture recording camera including mechanism for advancing picture film, means for photographically recording pictures onto the picture film as it advances, a sound recording camera including mechanism for advancing a sound film having a plurality of parallel sound tracks longitudinally thereof, means including a light valve unit for photographically recording sound onto a track of the advancing sound film, means for moving the light valve unit and the sound film relatively transversely with respect to the film advancement for recording the sound onto a selected sound track as the film advances, and means operatively connecting the picture film advancing mechanism and the sound film advancing mechanism for effecting synchronous advancement of the films, and means for indicating the sound track selected for recording sound thereonto.

10. In sound motion picture apparatus, a picture film, picture recording apparatus including means for advancing the picture film for recording motion pictures thereonto, a sound film having a sound track, means for advancing the sound film, means connecting the picture film advancing means and the sound film advancing means for effecting synchronous advancement of the films, means including a light source for recording sound onto the sound track in response to modulated energy corresponding to sound waves, another source of light directed onto the sound track for light fogging thereof, a circuit including a source of energy for the last named light source, and means for varying the amount of energy in said circuit for varying the degree of light fogging of said track.

11. In sound motion picture apparatus, a picture film, picture recording apparatus including means for advancing the picture film for recording pictures thereonto, a sound film having a plurality of sound tracks, means for advancing the sound film, means connecting the picture film advancing means and the sound film advancing means for effecting synchronous advancement thereof, means including a sound recording device for photographically recording sound onto a track of the sound film as it advances, means for moving the sound film and the device relatively transversely with respect to the film advancement for recording the sound onto a selected sound track, means including a light fogging device for photographically light fogging a sound track as the sound film advances, and means for moving the light fogging device and the sound film relatively transversely with respect to the film advancement for light fogging a selected sound track.

12. In sound motion picture apparatus, a picture film, picture recording apparatus including means for advancing the picture film for recording pictures thereonto, a sound film having a plurality of sound tracks, means for advancing said sound film, means connecting the picture film advancing means and the sound film advancing means for effecting synchronous advancement of the films, means including a sound recording device for photographically recording sound onto a track of the sound film as it advances, means for moving the sound film and the device relatively transversely with respect to the film advancement for recording the sound onto a selected sound track, and means including a light fogging device for photographically light fogging the track onto which the sound is being recorded.

13. In sound motion picture apparatus, a picture film, picture recording apparatus including means for advancing the picture film for recording motion pictures thereonto, a sound film having a plurality of sound tracks, means for advancing the sound film, means connecting the picture film advancing means and the sound film advancing means for effecting synchronous advancement of the films, means including a sound recording device for recording sound onto a track of the sound film as it advances, means for moving the sound film and the recording device relatively transversely with respect to the film advancement for recording the sound onto a selected sound track, means including a fading device for photographically fading a sound track as the sound film advances, means for moving the sound film and the fading device relatively transversely with respect to the film advancement for fading the track selected for recording sound thereonto, and means for indicating the sound track selected for recording the sound thereonto.

14. In sound motion picture apparatus, a picture film, means for advancing the film for recording motion pictures thereonto, a sound film having a plurality of sound tracks, means for advancing the sound film, means connecting the picture film advancing means and the sound film advancing means for effecting synchronous advancement of the films, means including a sound recording device for recording sound onto a track of the film as it advances, means moving the sound film and the device relatively transversely with respect to the film advancement for recording the sound onto a selected sound track, means including a fading device for photographically fading a sound track as the sound film advances, means for moving the sound film and the fading device relatively transversely with respect to the film advancement for fading the track selected for recording sound thereonto, means for indicating the track selected for recording sound thereonto by the sound recording device and means for indicating the track selected for the fading thereof by the fading device.

15. In sound motion picture apparatus, a motion picture film, a motion picture camera including a housing, mechanism in the housing for advancing the picture film for recording motion pictures thereunto, a sound film, a sound recording camera including a housing spaced from the picture camera housing, mechanism in the last named housing for advancing the sound film, means extending exteriorly of the housings connecting the picture and sound film advancing mechanisms for effecting synchronous advancement of the films, a light opening in the sound camera housing, a sound recording device secured to the sound camera housing including a source of modulated light corresponding to sound waves arranged to be projected through the opening onto the sound film for recording sound thereonto, a second light opening in the sound camera housing, and a light fogging device secured to the sound camera housing including another source of light arranged to be projected through the last named opening for light fogging the area of the sound film onto which the sound is recorded by the recording device.

16. In sound motion picture apparatus, a motion picture film, a motion picture camera including mechanism for advancing the picture film to record motion pictures thereonto, a sound film, a sound recording camera spaced from the picture camera including a light proof film housing having an opening, mechanism in the housing for advancing the film relatively to the opening, means connecting the film advancing mechanisms for effecting synchronous advancement of the films, a sound recording unit on the housing having a light aperture registering with the opening in the housing, means on the unit for projecting modulated light corresponding to sound waves through the aperture onto the film for recording sound thereonto, a second opening in the housing, a light fogging unit including a source of light arranged to be projected through the second named opening onto the same area of the sound film onto which the sound is being recorded, and means for moving the units and the sound film relatively transversely with respect to the advancement of said film for recording the sound on a selected transverse area as the film advances.

17. In sound motion picture apparatus, a picture film, mechanism for advancing the film for recording motion pictures thereonto, a sound film, mechanism for advancing the sound film spacedly from the picture film, means connecting the sound film mechanism and the picture film mechanism for effecting synchronous advancement of the films, means including a source of light and a light valve responsive to modulated energy corresponding to sound waves for projecting a beam of light to photographically record sound onto the sound film as it advances, and means including a second light source for directing a second beam of light onto the same area of the sound film onto which the sound is being recorded for the light fogging thereof.

18. In sound motion picture apparatus, a picture film, mechanism for advancing the film for recording motion pictures thereonto, a sound film, mechanism for advancing the sound film spacedly from the picture film, means connecting the picture film mechanism and the sound film mechanism for effecting synchronous advancement of the films, means including a source of light and a light valve responsive to modulated energy corresponding to sound waves for projecting a beam of light to photographically record sound onto the sound film as it advances, means including a second light source for directing a second beam of light onto the same area of the sound film onto which the sound is recorded for light fogging, said area and means affecting the last named light source for varying the amount of light in the beam for varying the degree of said light fogging.

OSCAR A. ROSS.